Figure 1:
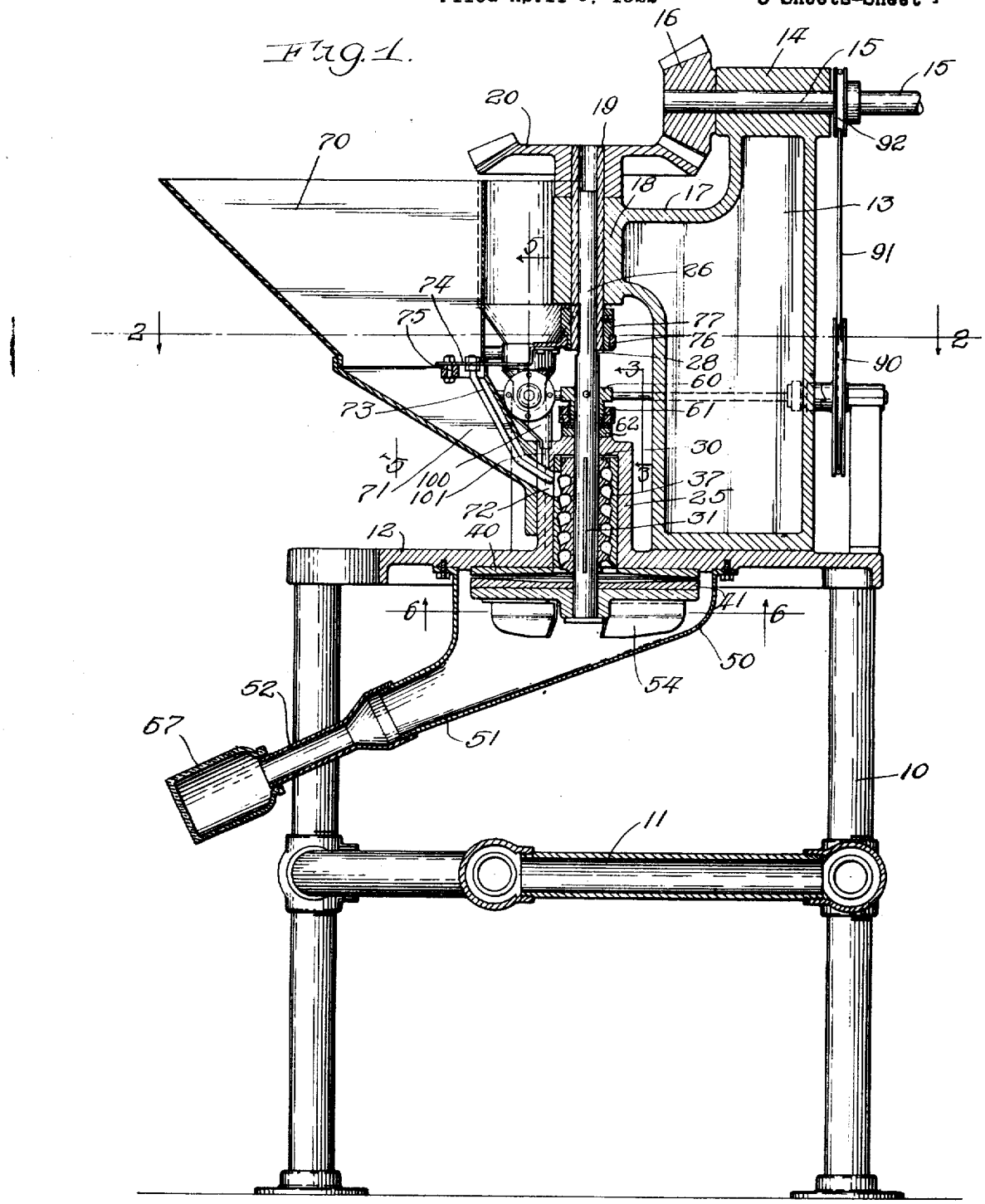

Aug. 21, 1923.

A. P. GROHENS 1,465,666

GRINDING MILL

Filed April 3, 1922    3 Sheets-Sheet 1

Inventor,
Albert P. Grohens,
By Lynforth, Lee, Chritton, Wiles,
Attys.

Aug. 21, 1923.
A. P. GROHENS
GRINDING MILL
Filed April 3, 1922 3 Sheets-Sheet 2
1,465,666
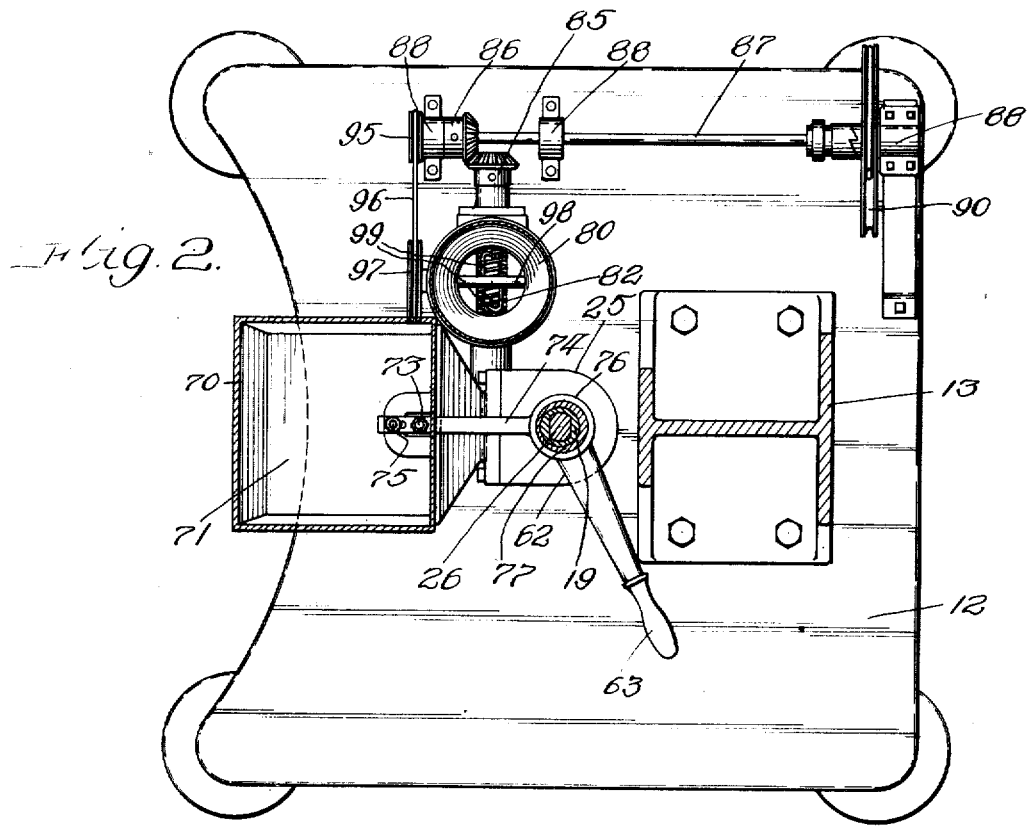
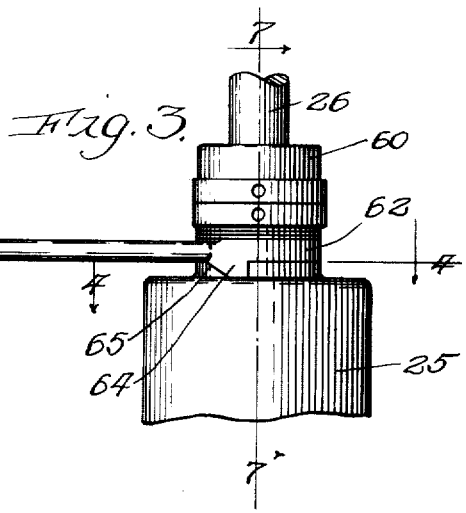
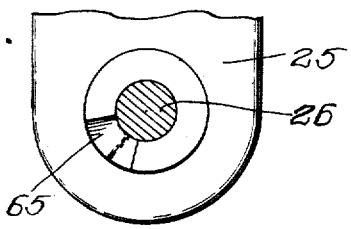
Inventor,
Albert P. Grohens,

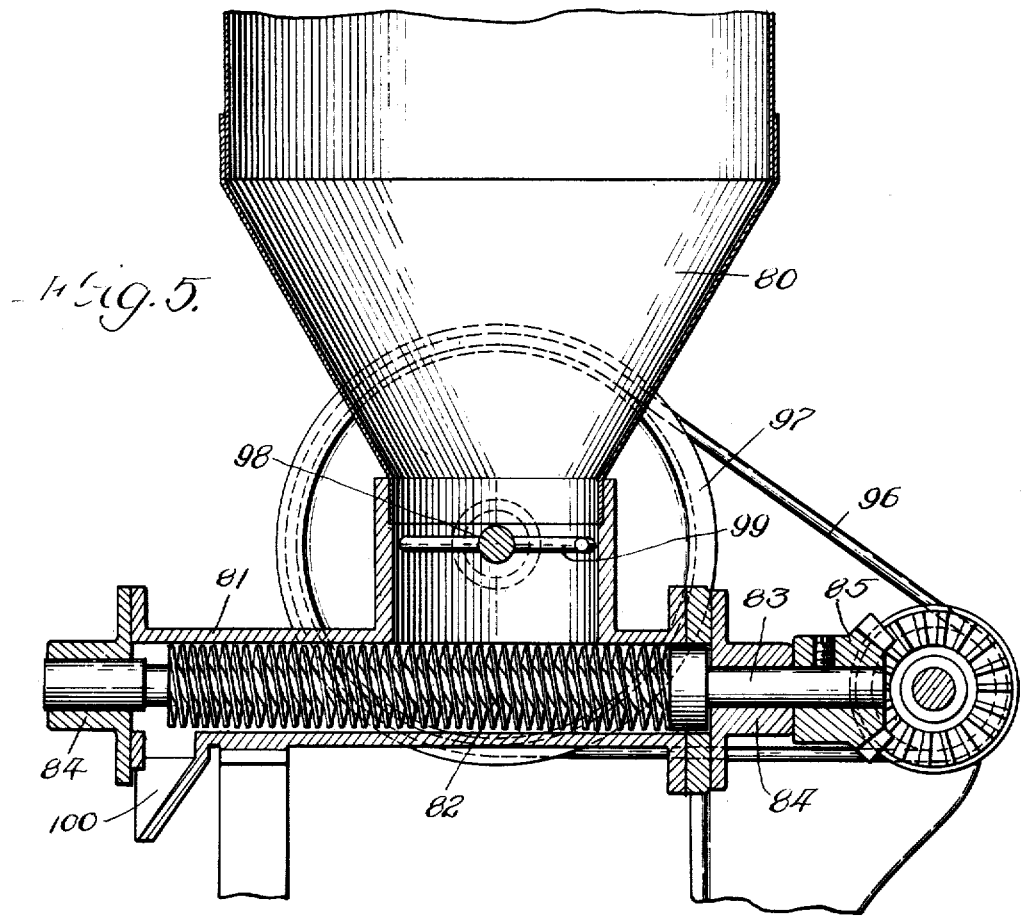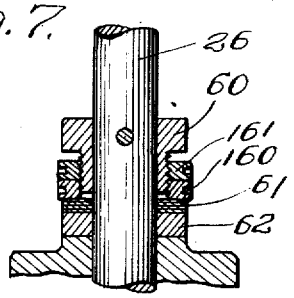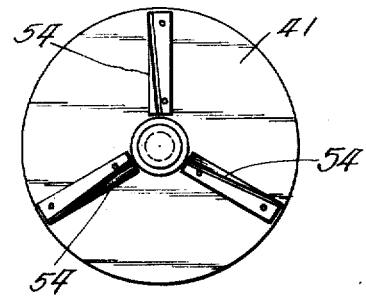

Patented Aug. 21, 1923.

1,465,666

UNITED STATES PATENT OFFICE.

ALBERT P. GROHENS, OF MARSHALL, MICHIGAN.

GRINDING MILL.

Application filed April 3, 1922. Serial No. 549,064.

*To all whom it may concern:*

Be it known that I, ALBERT P. GROHENS, a citizen of the United States, residing at Marshall, in the county of Calhoun and State of Michigan, have invented new and useful Improvements in Grinding Mills, of which the following is a specification.

This invention relates to improvements in grinding mills and more especially to a grinding mill more particularly adapted for use in connection with the grinding of nuts and similar edible oil or fatty substances. In the particular embodiment of my invention shown in this specification, I have disclosed a grinding mill adapted for grinding peanuts, in the making of peanut butter.

Among the features of my inventions is the provision of a grinding mill which can be easily and cheaply made, which is readily assembled and taken apart for cleaning and repairing purposes, which is strong, durable, and fast and clean in operation.

Another feature of my improved mill is the provision in connection therewith of means for automatically feeding the peanut butter from the mill into containers, under pressure. Such feeding means forces the peanut butter out through the discharge spout into a container; and also serves to carry away the peanut butter quickly and effectively from the grinding disks, thus preventing the peanut butter from backing up and interfering with the grinding operation.

Other features of my inventions include a vertical detachable conveyor, automatic salting device, an agitator in the peanut hopper, and releasing means adapted to afford an instantaneous release between the grinder disks in case any hard substance, such as a nail, should accidentally pass into the mill. The details of these features and of other features and advantages of my inventions, will be explained more fully as I proceed with my specification.

In that form of device embodying the features of my inventions, shown in the accompanying drawings, Figure 1 is a vertical sections view of my improved grinding mill, Fig. 2 is a view taken as indicated by the line 2 of Fig. 1, Fig. 3 is a view taken as indicated by the line 3 of Fig. 1, Fig. 4 is a view taken as indicated by the line 4 of Fig. 3, Fig. 5 is a view taken as indicated by the line 5 of Fig. 1, Fig. 6 is a view taken as indicated by the line 6 of Fig. 1, and Fig. 7 is a view taken as indicated by the line 7 of Fig. 3.

As shown in the drawings, 10 indicates suitable supports or legs, strengthened by cross-framing 11, and supporting a table top or platform 12, on which the grinding mill proper is supported. Mounted on the table top 12 is a vertically arranged casting 13, which carries at its upper end a bearing 14, in which is rotatably supported a horizontally arranged shaft 15, carrying at one end a bevel gear 16. Any suitable means, not shown, are provided for driving the shaft 15.

The casting 13 carried, near its top on one side, an extension 17 in which is formed a vertically arranged bearing 18, having rotatably mounted therein a vertically arranged sleeve 19 carrying on its upper end a bevel gear 20 meshing with the bevel gear 16. It will be seen by this construction, that rotation of the shaft 15 will drive the bevel gear 16, which in turn will drive the bevel gear 20 and sleeve 19. Directly below the bearing 18 and in alinement therewith, mounted on the table top 12, is a feed-screw housing 25. A shaft 26 has its upper end extending into the sleeve 19. This shaft 26 extends downwardly through the feed-screw housing 25, and has its lower end somewhat below the table top 12. The upper end of the shaft 26, where the same lies within the sleeve 19, and a short distance below, has its two opposite sides slightly flattened, as indicated by 28. These flattened surfaces engage with corresponding projections within the sleeve 19; so that vertical sliding movement of the shaft 26 is permitted within the sleeve 19, but rotation therein is prevented. Slidably, but non-rotatably, mounted on the shaft 26, within the feed-screw housing 25, is a feed screw 30 of the ordinary type. This feed screw 30 is provided with a vertically arranged slot adapted to engage with the spline 31 on the shaft 26, so that vertical sliding movement of the shaft with respect to the feed screw is permitted; but the feed screw is forced to rotate with the shaft. Lying within the feed-screw housing 25 is a cylindrical member 37 having its inner wall spirally grooved to cooperate with the grooves on the feed screw 30, in the usual manner, to cause downward feeding of material by the screw 30, when the same rotates.

Mounted on the lower surface of the table top 12 and concentrically arranged with the shaft 26, is an upper stationary grinding disk 40 having a hole in its center slightly larger than the feed screw 30, so that material fed downwardly by the feed screw 30 will pass through this hole in the center of the stationary grinding disk 40. Mounted on the lower end of the shaft 26 is a movable grinding disk 41, adapted to be rotated by the rotation of the shaft 26. The lower face of the stationary disk 40, and the upper face of the movable disk 41 are suitably grooved or notched, or provided with grinding teeth, in any suitable manner, so that material fed downwardly by the feed screw 30, as it is fed between these two faces of the grinding disks, will be pulverized and ground thereby; the completed ground product escaping outwardly and downwardly from between the disks at their peripheries. It will be noted that the grinding faces of these two disks do not lie in planes. Each of the faces is slightly concaved, so that they are more widely separated at the centers than at the peripheries. By this means, the first steps in the grinding process will be performed by the disks near their centers and the grinding will become progressively finer as the material being ground approaches the peripheries of the disks. The particular formation of the surfaces on the grinding faces of the disks 40 and 41 are not shown in detail, since there is a variety of ways in which these may be made, different ones being suitable for different materials, and degrees of fineness to which the same are to be ground.

Mounted on the under side of the table top 12 and surrounding the disks 40 and 41 is a filler or discharge casing 50 having a radially arranged filler or discharge spout 51, having detachably mounted on its end an extension spout 52.

The movable grinding disk 41 has mounted on its under side, lying inside of the filler casing 50, three radially arranged vanes 54. These vanes 54 hang downwardly from the disk 41 and each one is bent slightly backward with respect to the direction of rotation of the disk; so that they act to continually force the ground material downwardly and out of the spouts 51 and 52. These disks 54, it will be seen, will thus act as a force feed, to force the peanut butter out through the extension spout 52, under pressure, into containers which may be placed on the end thereof, such as indicated by 57. This force feed, therefore, operates to compress the peanut butter and force the same into a container free from bubbles; and such force feed also operates to remove the peanut butter downwardly from the grinding disks 40 and 41 and pass it out through the spouts 51 and 52; thus preventing it from backing up into the grinding disks and interfering with the grinding operation.

The following means are provided for separating the grinding disks in order to release the same in the event that any hard substance, such as a nail, passes into the mill and comes between the disks. The shaft 26 carries a collar 60 below which is arranged a thrust bearing 61 (see Figs. 3 and 7). Rotatably mounted on the shaft 26, below the thrust bearing 61, is a collar 62 adapted to be rotated by the lever 63. The underside of the collar 62 is provided with a slanting cam surface or tooth 64, adapted to cooperate with a corresponding notch, having a slanting surface 65, on the top of the feed-screw housing 25; so that rotation of the collar 63 (clockwise, looking downward) will cause said tooth 64 to ride up on the slanting surface 65, thus raising the collar 62, and thus causing upward pressure through the thrust bearing 61 against the collar 60 to lift the shaft 26. Such lifting of the shaft 26 will lift the grinding disk 41 and bring it close to the disk 40. The parts are so adjusted that when the collar 62 is in its lower position, the disks 40 and 41 will be widely enough separated, so that any hard substances, such as nails, which might accidentally have fallen into the mill, will be permitted to pass between the disks 40 and 41 without damage. The parts are so adjusted and set that when the collar 62 is in its upper position, with the tooth 64 out of the notch, the grinding disks will be in their regular grinding position. In the event of any hard substance passing into the machine and coming between the disks, all that is necessary is to quickly throw the lever 63 to rotate the collar 62 to permit the tooth 64 to ride down the slanting surface 65 and into the notch, thus lowering the disk 41 and separating it from the disk 40.

The following means are provided for regulating and adjusting the grinding disks, to give the desired degree of fineness in grinding. The collar 60 has its lower part made slightly smaller in diameter, and is threaded and carries two nuts 160 and 161. The lower nut 160 can be screwed up or down on the collar 60 and bears against the thrust bearing 61. It will be obvious that adjustment of this nut serves to raise or lower the shaft 26 and adjust the distance between the grinding disks 40 and 41. The nut 161 serves as a lock nut to hold the nut 160 in position.

The following means are provided for feeding peanuts to the mill. 70 indicates a hopper having a discharge mouth 71, at its lower end, opening into a hole 72 in the upper part of the feed-screw housing 25. Peanuts are placed in the hopper 70 and fed by gravity through the discharge opening 71 into the feed-screw housing 25, where they are taken up by the spiral grooves on the feed screw 30 and fed downwardly into the disks 40 and 41. It will be noted here that the feed screw 30 is arranged vertically, and feeds downwardly, so that the feeding process is at all times assisted by gravity. Means are also provided for agitating the peanuts in the discharge spout 71, to prevent the same from clogging, such means comprising an agitator rod 73 extending downwardly through the discharge spout 71 and having its lower end adjacent the hole 72 in the feed-screw housing 25. The upper end of the agitator rod 73 is fastened to a strap 74, adapted to be reciprocated by the rotation of the shaft 26. The outer end of the strap 74 is provided with a slot operating over a guide bolt 75, and its inner end is attached to an eccentric strap 76 arranged on an eccentric 77 mounted on the sleeve 19. It will be seen, therefore, that rotation of the sleeve 19 will cause reciprocation of the strap 74, and consequent reciprocation of the agitator 73.

The following means are provided for introducing and feeding salt and other desired materials into the peanuts as the same are fed into the feed-screw casing. Such means are shown most clearly in Figs. 2 and 5. 80 indicates a salt hopper, having horizontally arranged below it, in a suiable casing 81, a spiral feed screw 82, which may be of any suitable construction. The feed screw 82 is mounted on a shaft 83, suitably supported at its ends in the bearings 84 and adapted to be driven by a bevel gear 85, meshing with a bevel gear 86 on the end of the shaft 87 suitably supported in bearings 88. The shaft 87 has mounted on one end a belt wheel 90 adapted to be driven by a belt 91 running over a small belt wheel 92, on the shaft 15. The other end of the shaft 87 is provided with a smaller belt wheel 95, carrying a belt 96 adapted to operate a wheel 97 on one end of a shaft 98, extending horizontally through the lower end of the salt hopper 80 and carrying agitator arms 99, adapted to agitate salt in the hopper and permit the same to be fed by gravity downwardly to the feed screw 82. The feed screw 82 carries the salt horizontally through the casing 81 to its end where it falls out through the discharge opening 100 and into a small hole 101, entering near the lower end of the discharge opening 71, just before the peanuts enter the hole 72 in the upper end of the feed-screw housing 25.

While I have shown and described certain embodiments of my invention, it is to be understood that it is capable of many modifications. Changes, therefore, in the construction and arrangement may be made without departing from the spirit and scope of the inventiton as disclosed in the appended claims, in which it is my intention to claim all novelty inherent in my invention as broadly as possible in view of the prior art.

What I claim as new and desire to secure by Letters Patent, is:

1. In a grinding mill, a hopper adapted to contain material to be ground, a vertical feed-screw casing having an opening at the top to receive material from the hopper, grinding means located below the feed-screw casing, a feed screw within the feed-screw casing adapted to feed, with the aid of gravity, material to be ground downwardly from the hopper to the grinding means, and means for introducing salt into the material as it leaves the feed hopper.

2. In a grinding mill, a hopper adapted to contain material to be ground, a vertical feed-screw casing having an opening at the top to receive material from the hopper, grinding means located below the feed-screw casing, a feed screw within the feed-screw casing adapted to feed, with the aid of gravity, material to be ground downwardly from the hopper to the grinding means, and means for introducing salt into the material as it leaves the feed hopper, said means comprising a salt hopper and means for feeding salt from said salt hopper to the material to be ground as it leaves the feed hopper.

Witness my hand and seal this 31st day of March, 1922.

ALBERT P. GROHENS. [L. S.]